United States Patent [19]

Schlaak

[11] Patent Number: 5,016,972

[45] Date of Patent: May 21, 1991

[54] DETACHABLE MULTIPLE SPLICING CONNECTOR FOR LIGHT WAVEGUIDES

[75] Inventor: Helmut Schlaak, Berlin, Fed. Rep. of Germany

[73] Assignee: Siemens Aktiengesellschaft, Berlin & Munich, Fed. Rep. of Germany

[21] Appl. No.: 473,954

[22] PCT Filed: Aug. 11, 1988

[86] PCT No.: PCT/DE88/00502

§ 371 Date: Feb. 9, 1990

§ 102(e) Date: Feb. 9, 1990

[87] PCT Pub. No.: WO89/01641

PCT Pub. Date: Feb. 23, 1989

[30] Foreign Application Priority Data

Aug. 20, 1987 [DE] Fed. Rep. of Germany ....... 3728053

[51] Int. Cl.[5] .............................. G02B 6/40; G02B 6/38
[52] U.S. Cl. ................................. 350/96.22; 350/96.21
[58] Field of Search ............... 350/96.20, 96.21, 96.22, 350/96.15, 96.17, 96.24

[56] References Cited

U.S. PATENT DOCUMENTS

| | | | |
|---|---|---|---|
| 4,155,624 | 5/1979 | Logan et al. ..................... | 350/96.21 |
| 4,762,390 | 8/1988 | Finzel ............................... | 350/96.21 |
| 4,772,088 | 9/1988 | Finzel ............................... | 350/96.21 |
| 4,778,243 | 10/1988 | Finzel ............................... | 350/96.21 |
| 4,923,275 | 5/1990 | Kaukeinen ..................... | 350/96.22 X |
| 4,950,048 | 8/1990 | Kakii et al. ..................... | 350/96.20 |
| 4,973,127 | 11/1990 | Cannon, Jr. et al. ............ | 350/96.22 |

FOREIGN PATENT DOCUMENTS

| | | | |
|---|---|---|---|
| 109648 | 5/1984 | European Pat. Off. ..... | 350/96.22 X |
| 2522804 | 12/1976 | Fed. Rep. of Germany ... | 350/96.21 X |
| 2406211 | 5/1979 | France ........................ | 350/96.21 X |
| 8602172 | 4/1986 | World Int. Prop. O. ... | 350/96.22 X |

OTHER PUBLICATIONS

Wagner, "Futur 1.55-μm Undersea Lightwave System", Journal of Lightwave Technology, vol. LT-2, No. 6, pp. 1007–1015, Dec. 6, 1984.

Freeman et al., "Holding Fixture for Optical Fiber Array Connectors", Western Electric, Technical Digest, No. 52, Oct. 1978.

Primary Examiner—Brian Healy
Attorney, Agent, or Firm—Kenyon & Kenyon

[57] ABSTRACT

A detachable multiple splicing connector for light waveguides comprises splicing halves (1, 2) formed by support parts (3, 4, 5, 6) mutually aligned with maximum precision by means of guide grooves (19, 20, 21) and corresponding guide parts (22, 23). The support parts (3, 4, 5, 6) have at least one guide groove (19, 20, 21) along one side and are mutually connected in such a way that the latter is freely accessible. Guide strips (22, 23) can be easily inserted in the guide grooves (19, 20, 21). The arrangement and design of the guide grooves and guide strips improves the precision of alignment. This detachable multiple splicing connector is useful for optical components with light waveguide connections, in particular for commutatable connections.

3 Claims, 1 Drawing Sheet

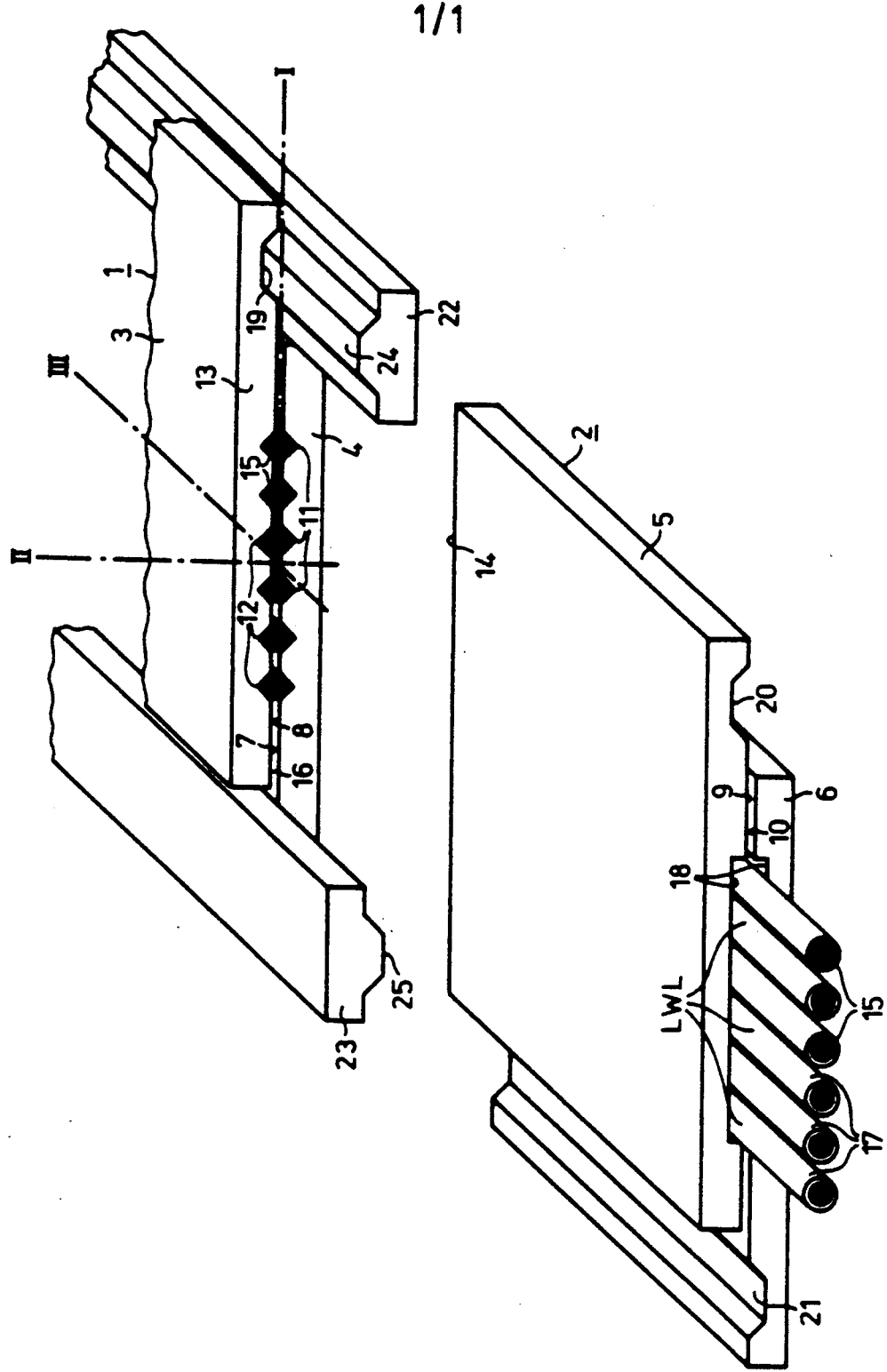

DETACHABLE MULTIPLE SPLICING CONNECTOR FOR LIGHT WAVEGUIDES

BACKGROUND OF THE INVENTION

The invention relates to a detachable multiple[fiber] splice connector for optical waveguides with two spliced halves meeting [by thrust or push] on the front side, comprised respectively of two bearing parts, which are interconnected on their top sides turned toward each other and, in the connecting area, carry optical waveguide sections, as well as with adapters running laterally and parallel to the optical waveguide sections in guide grooves on the top sides, by means of which [adapters] the two spliced halves are aligned to one other relative to the optical waveguide sections to be coupled.

Such a splice connector is known from the German Published Patent Application No. 25 22 804. Therein, the bearing parts are interconnected so that they overlap each other completely on their top sides turned toward each other. The guide grooves and adapters lie therefore between the top sides. The guide grooves are configured of channels, which are introduced into the top sides of the bearing parts by means of plastic deformation. The adapters are short centering pins, whose length is about equal to the thickness of the bearing part. They are each inserted about halfway into the openings formed respectively by two channels in both spliced halves, in a way which is similar to the "plug/socket principle".

SUMMARY OF THE INVENTION

The invention is based on such a splice connector and provides, according to the invention, that each bearing part exhibits, along a single side, at least one guide groove on its top side, that the bearing parts are interconnected in a way which allows the guide grooves to project freely, and that the adapters are designed as at least one insertable guide support.

As a result of the invention, in an advantageous way, a very exact alignment of the two spliced halves to one other is achieved.

Since the guide grooves project freely in the connected condition of the bearing parts and, therefore, are openly accessible from above over their entire length, the minimum of one guide support can be simply inserted into one of the guide grooves and does not need to be pushed in from one side. Therefore, these two guide elements can also exhibit cross-sectional shapes, whereby a simple insertion is not easily possible, since otherwise they would twist too easily. A particularly long guide support can also be used, since it is simply inserted and not pushed in; otherwise the danger of bending or even breaking off of the guide support would exist during the pushing in motion. With such a long guide support, which for example, in the inserted condition, extends over the entire length of the bearing parts, the alignment accuracy can be further increased by improving the alignment [straight guidance] of the two spliced halves to each other. Developing the adapters as guide supports thereby ensures the requisite stability while simultaneously providing good manufacturing possibilities. The alignment accuracy is likewise improved by providing at least two guide supports. This requires a lateral configuration of only one guide groove on each bearing part. Moreover, the alignment accuracy can possibly be further improved by providing additional guide grooves, arranged in parallel on the same side of each bearing part, in accordance with the number of guide supports Furthermore, in the case of the splice connector according to the invention, two different coupling possibilities exist for the optical waveguides to be coupled, in that the two spliced halves can also be aligned rotated by 180° [relative] to each other. This is of special significance, for example, in the operation of bidirectional optical-waveguide components. In spite of this possibility for reversal, however, the highly accurate alignment of the two spliced halves to each other still remains in tact, due to the open accessibility and configuration of the guide grooves and the possibilities for refining the guide cross-sections.

Possible cross-sectional shapes for the guide grooves to attain an exact alignment of the two spliced halves are any geometric shapes which are not undercut, such as for example triangular or rectangular shapes. A particularly high guidance accuracy, however, is attained with exclusive [straight]-sided guides. It is, therefore, particularly advantageous according to a refinement of the splice connector according to the invention, for the guide grooves to be designed with a trapezoidal-shape in their cross-section and for the guide supports to exhibit corresponding trapezoidal-shaped elevations. Such a trapezoidal guide can be manufactured relatively easily and nevertheless still achieves a highly accurate guidance, since the guidance is carried out exclusively by means of the trapezoid sides. Double fits [tolerances] are avoided. It is thereby extremely simple to insert the guide supports into the guide grooves.

When, according to another refinement of the splice connector according to the invention, the bearing parts and the guide supports are made of silicon, the guide grooves and the guide supports—particularly those with trapezoidal shaped guidance cross-sections—are able to be manufactured in a particularly simple way by means of an etching operation and thereby nevertheless within tolerances in the micrometer range, since the lattice structure of the silicon used is taken advantage of. Such etching processes are known for producing V-grooves, which are used for the positioning of optical fiber sections (see for example the essay by Finzel and Steinmann "Detachable Multiple-Fiber Splice Connector for Optical Waveguides", Telcom Report 9, 1986, issue 5, pages 289 to 293).

Also known from this essay is a detachable, multiple-fiber splice connector with guide grooves situated so that they are openly accessible, which exhibit a trapezoidal shaped guide profile, in the same way as the guide supports belonging to them. Although in the case of this connector, the individual spliced halves cannot be aligned to each other rotated by 180°, so that the optical waveguides can only be coupled to each other in one single allocation.

BRIEF DESCRIPTION OF THE DRAWING

Based on the FIGURE, in the following a particularly preferred exemplified embodiment of the detachable multiple-fiber splice connector according to the invention is explained in greater detail. The FIGURE schematically depicts in a perspective view the parts of the splice connector which are essential to the invention. Thereby, the one spliced half is depicted in a truncated form and the other is shown in its complete form. In the same way, the two guide supports are illustrated only in sections The splice connector is shown in its open condition; the housing which supports the two spliced halves is left out to provide a better overall view.

DETAILED DESCRIPTION OF THE INVENTION

Two spliced halves 1 and 2 which have an identical mirrored-image design are depicted in the FIGURE. The one spliced half 1 consists of two bearing parts 3 and 4, the other spliced half 2 of two bearing parts 5 and 6. The bearing parts 3, 4, 5 and 6 consist preferably of silicon. The bearing parts 3 and 4 or 5 and 6 conform with each other in their structural design. The bearing parts 3 and 4 are thereby homologously [with a mirror image] identical to the bearing parts 5 and 6. The bearing parts 3 and 4 or 5 and 6 exhibit, on top sides 7 and 8, respectively 9 and 10 turned toward each other, a number of V-shaped grooves 11 and 12 corresponding to the number of optical waveguide sections to be coupled, which [grooves] are introduced into the silicon using a known etching process Therefore, the V-grooves 11 and 12 can be positioned side-by-side with an accuracy in the micrometer range which is necessary for the alignment and reversibility of the two spliced halves 1 and 2.

In the area of end faces 13 and 14 of the two bearing halves 3 and 4 or 5 and 6, the grooves 11 and 12 are adjusted to the diameter of the glass waveguides 15 of the optical waveguide sections LWL. One should take into consideration in this case that the V-grooves 11 and 12 must exhibit a maximum of one depth, which is less than half of the glass waveguide diameter, so that, on the one hand, the glass waveguides 15 lie exactly in the center between the bearing parts 3 and 4 or 5 and 6 in the areas of the end faces 13 and 14 and, on the other hand, through resulting slits 16 can act directly on the glass waveguides 15 with the required retention force. In order to also be able to retain the optical waveguide sections LWL, still surrounded with a covering 17, between the bearing plates 3 and 4 or 5 and 6, the bearing parts 3, 4, 5 and 6 are provided with corresponding recesses 18 in their areas turned away from the end faces 13 and 14, so that a strain relief of the optical waveguide sections LWL results. The optical waveguide sections LWL surrounded with the covering 17 can, however, also be positioned in V-grooves widened accordingly to attain a better alignment.

Each bearing part 3, 4, 5 and 6 exhibits furthermore a guide groove 19, 20, 21 running laterally and parallel to the optical waveguide sections LWL configured longitudinally. The bearing parts 3 and 4 or 5 and 6 are interconnected in such a manner that the guide grooves 19, 20, 21 project freely on the side and accordingly lie openly accessible. In a connecting area of each spliced half 1 and 2, in which all optical waveguide sections LWL lie, the bearing parts 3 and 4 or 5 and 6 are connected by means of an adhesive, preferably with an epoxide resin adhesive The two spliced halves 1 and 2 are designed respectively to be axially symmetric, that is they are symmetrical relative to the position of the V-grooves 11 and 12 and of the guide grooves 19, 20, 21, as well as to a center line I situated in the front ends 13 and 14, and also to a center line II which is perpendicular to the center line I. The point of interception of the two center lines I and II forms the point of rotation of the spliced havles 1 or 2. As a result of this axial symmetry, it is possible, for example, that the one spliced half 1 is rotated by 180° about a center line III running through the point of interception of the two center lines I and II and can be coupled again, so that, after that, the optical waveguide sections LWL of both spliced halves 1 and 2 are interconnected in a sequence interchanged accordingly.

The spliced halves 1 and 2 are interconnected through adapters in the form of traversing guide supports 22 and 23, which are inserted in the guide grooves 19, 20, 21 and into the guide groove hidden in the FIGURE. In the FIGURE, the guide supports 22 and 23 are depicted positioned in the guide groove 19 and in the hidden guide groove of the one spliced half 1. The guide supports 22 and 23 project much further over the spliced half 1, preferably over the entire length of the other spliced half 2, to provide for a coupling of the two spliced halves 1 and 2.

In the depicted exemplified embodiment, the guide supports 22 and 23 are also manufactured of silicon. In this case, it is particularly advantageous when the guide grooves 19, 20, 21—as depicted in the FIGURE—are trapezoidal shaped in their cross section and the guide supports 22 and 23 exhibit corresponding trapezoidal-shaped elevations 24 and 25. The thus obtained trapezoidal guidance is, since it is purely a [straight] side guidance, highly precise and can be manufactured in a simple way by etching the bearing parts 3, 4, 5 and 6 consisting of silicon as well the guide supports 22 and 23.

The assembly of the detachable multiple-fiber splice connector according to the invention can take place in the following manner. In a housing which is narrowly toleranced relative to the width of the spliced halves 1 or 2 and is not depicted in the FIGURE, the guide support 22 is first inserted laterally. After that, the spliced halves 1 and 2 previously manufactured separately are placed with their guide grooves 19 and 20 on the guide support 22, so that, already in a first operation, they are aligned with each other in true alignment relative to the optical waveguide sections LWL to be coupled. The spliced halves 1 and 2 meet each other (by thrust or push) thereby on the front side. To improve the alignment, afterwards the second guide support 23 is inserted in the guide groove 21 of the spliced half 2 and into the corresponding guide groove-hidden in the FIGURE—of the spliced half. 1. It is thereby advantageous to design the housing so that a seating of the spliced halves 1 and 2 in the housing only follows in the area of the two guide supports 22 and 23, so that in any case the trapezoidal guidance is effective and the bearing parts 4 or 6 in their central area do not come to rest in the housing.

The two spliced halves 1 and 2 are fixed together in the aligned state then, for example, by means of generally known fastening springs (not depicted here), which engage with the housing accordingly.

The detachable multiple-fiber splice connector according to the invention makes possible in a simple manner an exchange of the optical waveguides LWL to be coupled by means of a 180° rotation of one of the two spliced halves 1 or 2. Over and above that, the splice connector guarantees a highly precise alignment of the two spliced halves 1 and 2 to each other by means of the refinement and configuration of the guide devices in the form of guide grooves 19,20, 21 arranged to be openly accessible and guide supports 22 and 23, as well as the possible application of a modern etching method in the silicon, whereby the exact alignment provides for a maximum coupling efficiency between the optical waveguide sections LWL and thus for a high quality of the splice connector.

I claim:

1. A detachable multiple-fiber splice connector for optical waveguides having two splice halves meeting on front sides thereof, each splice half comprising two bearing parts having surfaces facing each other, said surfaces defining a connecting area, said connecting area being adapted for carrying optical waveguide sections, and further comprising adapters disposed laterally and parallel to the optical waveguide sections in guide grooves, said guide grooves being disposed on said surfaces, said adapters providing means for aligning the two splice halves with one another relative to the optical waveguide sections to be coupled, each bearing part having at least one guide groove on the respective surface, the guide grooves projecting freely from the respective bearing parts such that the guide grooves freely extend past the bearing part which they face, the adapters comprising a guide support insertable into said freely extending guide grooves for aligning said two splice halves.

2. The detachable multiple-fiber splice connector recited in claim 1, wherein the guide grooves have a trapezoidal shape in cross-section and the guide support adapters have corresponding trapezoidal shaped elevations.

3. The detachable multiple-fiber splice connector recited in claim 1, wherein the bearing parts and the guide supports are made of silicon.

* * * * *